F. B. STRATFORD.
SPRING SUSPENSION.
APPLICATION FILED OCT. 24, 1910.

1,031,394.

Patented July 2, 1912

Witnesses:

Frank B. Stratford, Inventor
By his Attorney

UNITED STATES PATENT OFFICE.

FRANK B. STRATFORD, OF JERSEY CITY, NEW JERSEY.

SPRING SUSPENSION.

1,031,394.     Specification of Letters Patent.     Patented July 2, 1912.

Application filed October 24, 1910. Serial No. 588,806.

*To all whom it may concern:*

Be it known that I, FRANK B. STRATFORD, a citizen of the United States, residing at Jersey City, in the county of Hudson and State of New Jersey, have invented certain new and useful Improvements in Spring Suspensions, of which the following is a specification, reference being had therein to the accompanying drawing.

My invention relates to improvements in spring suspensions and has particular reference to the same as applied to vehicles, more particularly automobiles.

Figure 1:
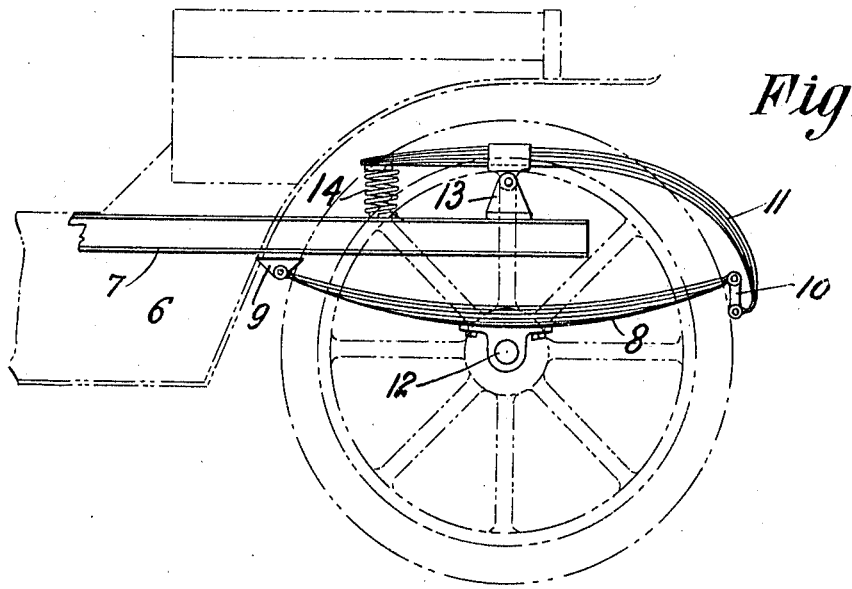
Figure 2:
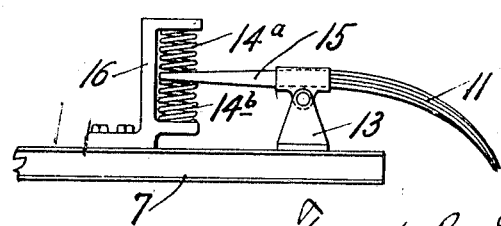

Referring to the accompanying drawings, Figure 1 illustrates in broken section and in dotted outline, the front part of an automobile showing an application of one form of my invention, and Fig. 2 illustrates a modification.

6 is the body of the vehicle mounted upon the main framework 7 in the usual manner, and 8 is a usual form of spring found in vehicles of this character. One end of the spring is preferably secured to the framework 7 by a suitable bearing such as 9 and the other end is preferably mounted in a suitable bearing such as 10 which also serves as a bearing for the spring 11. The spring 8 preferably rests upon the axle 12 as shown. Upon the upper part of the framework 7 is provided a suitable bearing such as 13 in which the spring 11 may be pivotally mounted, the other end of the spring 11 being secured to a suitable spring such as 14, also mounted upon the framework 7. This arrangement is found to increase the resiliency of bearing without weakening the construction and vehicles provided with springs arranged in this manner are found to ride with a minimum of jar or shock, being far more comfortable than when provided with the usual arrangement of springs.

In Fig. 2, the spring 11 is shown provided with a spring above and below the inward end 15 as shown at 14$^a$ and 14$^b$ by mounting the same in a suitable bracket such as 16 and the inward end of the spring is preferably made solid.

Of course it will be understood that various other modifications may be made without departing from the spirit of the invention as set forth in the claims.

Having described my invention, what I claim as new, and desire to secure by Letters Patent is:

1. A spring suspension for vehicles comprising, in combination, a supporting spring connected at one end to the body of the vehicle and at an intermediate point connected to the running gear, a second spring secured at an intermediate point above said body and at one end connected with the opposite end of said supporting spring, another spring secured above said body and connected with the opposite end of said second spring, whereby the upward movement of said opposite end of said second spring causes said other spring to become extended.

2. A spring suspension for vehicles comprising, in combination, a supporting spring connected at one end to the body of the vehicle and at an intermediate point connected to the running gear, a second spring secured at an intermediate point above said body and at one end connected with the opposite end of said supporting spring, said second spring having a solid extension, another spring secured above said body and said solid extension of said second spring secured to said other spring, whereby any movement of said solid extension is opposed by said other spring.

In testimony whereof I affix my signature in presence of two witnesses.

FRANK B. STRATFORD.

Witnesses:
  LOUISE ENDERLE,
  THOMAS A. HILL.